United States Patent [19]
Lippincott

[11] Patent Number: 5,914,729
[45] Date of Patent: *Jun. 22, 1999

[54] VISUAL FRAME BUFFER ARCHITECTURE

[75] Inventor: Louis A. Lippincott, Roebling, N.J.

[73] Assignee: Intel Corporation, Santa Clara, Calif.

[ * ] Notice: This patent issued on a continued prosecution application filed under 37 CFR 1.53(d), and is subject to the twenty year patent term provisions of 35 U.S.C. 154(a)(2).

This patent is subject to a terminal disclaimer.

[21] Appl. No.: 08/919,872

[22] Filed: Aug. 28, 1997

Related U.S. Application Data

[63] Continuation of application No. 08/588,558, Jan. 18, 1996, abandoned, which is a continuation of application No. 08/425,785, Apr. 20, 1995, Pat. No. 5,546,531, which is a continuation of application No. 08/275,644, Jul. 15, 1994, abandoned, which is a continuation of application No. 07/870,564, Apr. 17, 1992, abandoned.

[51] Int. Cl.[6] ..................................................... G06F 13/00
[52] U.S. Cl. .............................................. 345/508; 345/501
[58] Field of Search ............................ 345/501, 507–509, 345/132, 133, 149

[56] References Cited

U.S. PATENT DOCUMENTS

| | | | |
|---|---|---|---|
| 4,494,144 | 1/1985 | Brown ..................................... | 348/420 |
| 4,599,611 | 7/1986 | Bowker et al. ........................ | 345/116 |
| 4,737,916 | 4/1988 | Ogawa et al. ......................... | 395/135 |
| 4,791,580 | 12/1988 | Sherrill et al. ......................... | 395/164 |
| 4,868,765 | 9/1989 | Diefendorff ............................ | 395/157 |
| 4,907,086 | 3/1990 | Truong .................................... | 345/113 |
| 4,947,257 | 8/1990 | Fernandez et al. ..................... | 345/120 |
| 4,947,260 | 8/1990 | Reed et al. ............................. | 358/447 |
| 4,979,130 | 12/1990 | Li et al. .................................. | 395/135 |
| 4,991,014 | 2/1991 | Takahashi et al. ..................... | 348/590 |
| 4,991,110 | 2/1991 | Hannah ................................... | 395/166 |
| 4,991,112 | 2/1991 | Callemyn ................................ | 395/166 |
| 4,994,912 | 2/1991 | Lumelsky et al. ..................... | 345/213 |
| 5,025,249 | 6/1991 | Seiler et al. ............................ | 345/119 |
| 5,056,041 | 10/1991 | Guttag et al. .......................... | 395/164 |
| 5,097,257 | 3/1992 | Clough et al. ......................... | 345/196 |
| 5,119,082 | 6/1992 | Lumelsky et al. ..................... | 345/200 |
| 5,151,975 | 9/1992 | Shiraki et al. ......................... | 395/153 |
| 5,179,639 | 1/1993 | Taaffe .................................... | 395/164 |
| 5,216,413 | 6/1993 | Seiler et al. ............................ | 395/164 |
| 5,220,312 | 6/1993 | Lumelsky et al. ..................... | 345/200 |

(List continued on next page.)

FOREIGN PATENT DOCUMENTS

| | | |
|---|---|---|
| 0384257 | 8/1990 | European Pat. Off. . |
| 2073997 | 10/1981 | United Kingdom . |

OTHER PUBLICATIONS

"The Video Processor for a Personal Computer"—T. Tatsumi et al. —IEEE Transactions on Consumer Electronics, vol. 35 No. 3, Aug. 1989.

PCT International Search Report (Form PT/ISA/210)—3 pages.).

Annex to the International Search Report on International Patent Application No. US 9302772 SA73532 (EPO Form PO479) 1 sheet.

IBM Technical Disclosure Bulletin, vol. 32, No. 4B, Sep. 1989 —Video System with Real–Time Multi–Image Capability and Transparency.

*Primary Examiner*—Kee M. Tung
*Attorney, Agent, or Firm*—William H. Murray; N. Stephan Kinsella

[57] ABSTRACT

Visual data in a first color format stored in first memory locations are merged with visual data in a second color format, which different from the first color format, stored in second memory locations to form a merged pixel stream. An analog signal is generated representative of the merged pixel stream. In a preferred embodiment, one set of visual data is graphics data in an 8-bit CLUT format and the other set is video data in an 8-bit packed YUV9 format (also known as the 4:1:1 format). In this embodiment, the video data is unpacked and chromakeying is applied to generate the merged pixel stream.

16 Claims, 1 Drawing Sheet

U.S. PATENT DOCUMENTS

| | | | |
|---|---|---|---|
| 5,230,041 | 7/1993 | Dinwiddie, Jr. et al. | 395/162 |
| 5,241,658 | 8/1993 | Masterson et al. | 395/164 |
| 5,257,348 | 10/1993 | Roskowski et al. | 395/162 |
| 5,274,753 | 12/1993 | Roskowski et al. | 395/164 |
| 5,345,554 | 9/1994 | Lippincott et al. | 395/164 |
| 5,347,624 | 9/1994 | Takanashi et al. | 395/157 |
| 5,402,513 | 3/1995 | Schafer | 345/127 |

VISUAL FRAME BUFFER ARCHITECTURE

This is a continuation of application Ser. No. 08/588,558, filed Jan. 18, 1996; abandoned which is a continuation of application Ser. No. 08/425,785, filed Apr. 20, 1995; U.S. Pat. No. 5,546,531 which is a continuation of application Ser. No. 08/275,644, filed Jul. 15, 1994; abandoned which is a continuation of application Ser. No. 07/870,564, filed Apr. 17, 1992, abandoned.

FIELD OF THE INVENTION

This invention relates to video signal processing generally and particularly to systems for providing a digital signal representative of video and graphics information.

BACKGROUND OF THE INVENTION

The goal of attaining an integrated video/graphics system (Integrated Visual Architecture) requires a system architect to balance often conflicting requirements of video subsystems and graphics subsystems. For example, while increasing horizontal and vertical resolution is beneficial to graphics images, in digital video subsystems increasing horizontal and vertical resolution can actually be detrimental to the overall image quality. Likewise, in graphics subsystems, the pixel depth, i.e. the number of simultaneous colors available, is not as important as it is for video systems. While it may be hard to justify the additional system cost of 16 bit, near-true-color pixels for the graphics system, a video system can arguably make use of deeper 24 bit pixels.

The performance budget of a video processor in a digital video subsystem during playback is divided and used to perform two tasks: creating the video image from a compressed data stream and copying/scaling the image to the display buffer. The performance budget of the video subsystem must be balanced between the copy/scale operation and the video decompression operation. Both operations must get performed thirty times a second for smooth, natural motion video. The division of the performance budget is usually done to worse case which results in an allocation of sufficient performance for a full screen motion video copy/scale operation with the remaining performance being dedicated to the video decompression operation. If the number of pixels (and/or bytes) that have to be written in the copy/scale operation are increased, the performance of the video decompression necessarily decreases. In ever increasing resolutions, for a given level of video technology, a point will be reached where the video image starts to degrade because the information content in the decompressed image is too low. Increasing the resolution beyond this point would be analogous to playing back a poor copy of a VHS tape on the most expensive, highest-quality TV available; the TV would reproduce the low-quality images perfectly.

Several formats have been presented for storing pixel data in a video subsystem. One approach is to simply have 24 bits of RGB information per pixel. This approach yields the maximum color space required for video at the expense of three bytes per pixel. Depending on the number of pixels in the video subsystem, the copy/scale operation could be overburdened.

A second approach is a compromise of the 24 bit system and is based on 16 bits of RGB information per pixel. Such systems have less bytes for the copy/scale operation but also have less color depth. Additionally, since the intensity and color information are encoded equally in the R, G and B components of the pixel, the approach does not take advantage of the human eye's sensitivity to intensity and insensitivity to color saturation. Other 16 bit systems have been proposed that encode the pixels in a YUV format such as 6, 5, 5 and 8, 4, 4. Although somewhat better than 16 bit RGB, the 16 bit YUV format does not come close to the performance of 24 bit systems.

The 8 bit CLUT provides a third approach. This method uses 8 bits per pixel as an index into a color map that typically has 24 bits of color space as the entry. This approach has the advantages of low byte count and 24 bit color space. However, since there are only 256 colors available on the screen, image quality suffers. Techniques that use adjacent pixels to "create" other colors have been demonstrated to have excellent image quality, even for still images. However, this dithering technique often requires complicated algorithms and "custom" palette entries in the DAC as well as almost exclusive use of the CLUT. The overhead of running the dithering algorithm must be added to the copy/scale operation.

One approach for storing pixel data in a video subsystem has been to represent the intensity information with more bits than is used to represent the color saturation information. The color information is subsampled in memory and interpolated up to 24 bits per pixel by the display controller as the information is being displayed. This technique has the advantage of full color space while maintaining a low number of bits per pixel. All of the pixel depth/density tradeoffs are made in the color saturation domain where the effects are less noticeable. Several variations of this method exist and have been implemented in a display processor from Intel. In the Intel system, pixel depths typically range from 4.5 to 32 bits per pixel.

Motion video on the Intel system is displayed in a 4:1:1 format called the "9 bit format". The 4:1:1 means there are 4 Y samples horizontally for each UV sample and 4 Y samples vertically for each UV sample. If each sample is 8 bits then a 4×4 block of pixels uses 18 bytes of information or 9 bits per pixel. Although image quality is quite good for motion video the 9 bit format may be deemed unacceptable for display of high-quality stills. In addition, it was found that the 9 bit format does not integrate well with graphics subsystems. Other variations of the YUV subsampled approach include an 8 bit format.

As noted above, the requirements for a graphics system include high horizontal and vertical resolution with shallow pixels. A graphics system in which the display was 1280× 1024 with 8 bit clut pixels would likely meet the needs of all but the most demanding applications. In contrast, the requirements for the video system include the ability to generate 24 bit true color pixels with a minimum of bytes in the display buffer. A video system in which the display was 640×512×8 bit (YUV interpolated to 24 bits and upsampled to 1280×1024) would also meet the needs of most applications.

Systems integrating a graphics subsystem display buffer with a video subsystem display buffer generally fall into two categories. The two types of approaches are known as Single Frame Buffer Architectures and Dual Frame Buffer Architectures.

The Single Frame Buffer Architecture (SFBA) is the most straight forward approach and consists of a single graphics controller, a single DAC and a single frame buffer. In its simplest form, the SFBA has each pixel on the display represented by bits in the display buffer that are consistent in their format regardless of the meaning of the pixel on the display. In other words, graphics pixels and video pixels are indistinguishable in the frame buffer RAM. The SFBA graphics/video subsystem, i.e. the SFBA visual system, does not address the requirements of the video subsystem very well. Full screen motion video on the SFBA visual system requires updating every pixel in the display buffer (30 times a second) which is most likely on the order of 1280×1024 by 8 bits. Even without the burden of writing over 30 M Bytes per second to the display buffer, it has been established that 8 bit video by itself does not provide the required video quality. This means the SFBA system can either move up to 16 bits per pixel or implement the 8 bit YUV subsampled technique. Since 16 bits per pixel will yield over 60 M Bytes per second into the frame buffer, it is clearly an unacceptable alternative.

A visual system must be able to mix video and graphics together on a display which requires the display to show on occasion a single video pixel located in between graphics pixels. Because of the need to mix video and graphics there is a hard and fast rule dictating that every pixel in the display buffer be a stand-alone, self-sustaining pixel on the screen. The very nature of the 8 bit YUV subsampled technique makes it necessary to have several 8 bit samples before one video pixel can be generated, making the technique unsuitable for the SFBA visual system.

The second category of architectures integrating video and graphics is the Dual Frame Buffer Architecture (DFBA). The DFBA visual system involves mixing two otherwise free-standing single frame buffer systems at the analog back end with a high-speed analog switch. Since the video and graphics subsystems are both single frame buffer designs each one can make the necessary tradeoffs in spatial resolution and pixel depth with almost complete disregard for the other subsystem. DFBA visual systems also include the feature of being loosely-coupled. Since the only connection of the two systems is in the final output stage, the two subsystems can be on different buses in the system. The fact that the DFBA video subsystem is loosely-coupled to the graphics subsystem is usually the overriding reason such systems, which have significant disadvantages, are typically employed.

DFBA designs typically operate in a mode that has the video subsystem genlocked to the graphics subsystem. Genlocked in this case means having both subsystems start to display their first pixel at the same time. If both subsystems are running at exactly the same horizontal line frequency with the same number of lines, then mixing of the two separate video streams can be done with very predictable results.

Since both pixel streams are running at the same time, the process can be thought of as having video pixels underlaying the graphics pixels. If a determination is made not to show a graphics pixel, then the video information will show through. In DFBA designs, it is not necessary for the two subsystems to have the same number of horizontal pixels. As an example, it is quite possible to have 352 video pixels underneath 1024 graphics pixels. The Intel ActionMedia™ boards are DFBA designs and can display an arbitrary number of video pixels while genlocked to an arbitrary line rate graphics subsystem. The only restrictions are that the frequency required to support the configuration be within the 82750DB's 12 MHz to 45 Mhz range.

The decision whether to show the video information or the graphics information in DFBA visual systems is typically made on a pixel by pixel basis in the graphics subsystem. A technique often used is called "chroma keying". Chroma keying involves detecting a specific color (or color entry in the CLUT) in the graphics digital pixel stream. Another approach referred to as "black detect", uses the graphics analog pixel stream to detect black, since black is the easiest graphics level to detect. In either case, keying information is used to control the high-speed analog switch and the task of integrating video and graphics on the display is reduced to painting the keying color in the graphics display where video pixels are desired. Intel's ActionMedia II™ product implements chroma keying and black detect.

There are several disadvantages to DFBA visual systems. The goal of high-integration is often thwarted by the need to have two separate, free-standing subsystems. The cost of having duplicate DACs, display buffers, and CRT controllers is undesirable. The difficulty of genlocking and the cost of the high-speed analog switch are two more disadvantages. In addition, placing the analog switch in the graphics path will have detrimental effects on the quality of the graphics display. This becomes an ever increasing problem as the spatial resolution and/or line rate of the graphics subsystem grows.

It is an object of the present invention to provide an integrated system for storing and displaying graphics and video information.

It is further object of the present invention to provide a system for storing and displaying either graphics or video information, which system can be easily upgraded into an integrated system for storing and displaying graphics and video information by merely augmenting the system with additional memory.

Further objects and advantages of the invention will become apparent from the description of the invention which follows.

SUMMARY OF THE INVENTION

The present invention comprises a method and apparatus for processing visual data. According to a preferred embodiment, first memory locations store visual data in a first color format and second memory locations store visual data in a second color format which is different from the first color format. A merged pixel stream is formed from the visual data in the first color format stored in the first memory locations and the visual data in the second color format stored in the second memory locations, and an analog signal is generated representative of the merged pixel stream.

DETAILED DESCRIPTION OF THE PREFERRED EMBODIMENT

Figure 1:
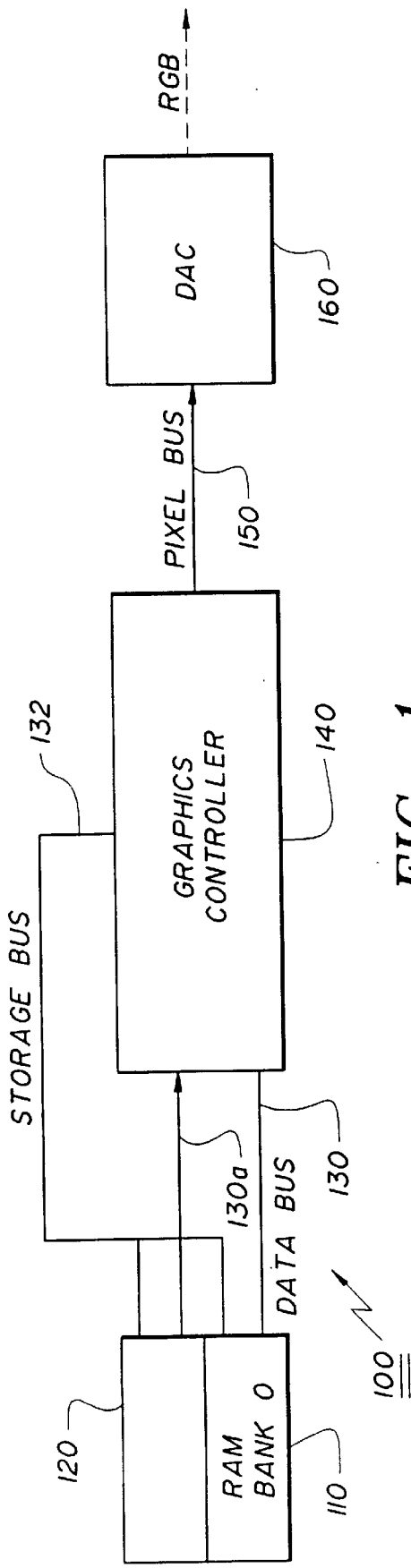
FIG. 1 is a block diagram illustrating the operation of a first preferred embodiment of the present invention.

Referring now to FIG. 1, there is shown a block diagram illustrating the operation of an apparatus, designated generally 100, for processing visual data according to a first preferred embodiment of the present invention. The invention shown includes first storage means 110 for storing a first bit plane of visual data in a first format. First storage means 110 is coupled to graphics controller 140 through storage bus 132. First storage means 110 and graphics controller 140 are also coupled by data bus 130. The invention also includes means 120 for receiving a second storage means for storing a second bit plane of visual data in a second format different from the first format. Means 120 is adapted to couple a second storage means to graphics controller 140 through the storage bus 132. Means 120 is also adapted to couple the second storage means to graphics controller 140 by data bus 130a. Graphics controller 140 includes means for forming a merged pixel stream from visual data stored on said first and second storage means. Means 160 for displaying the merged pixel stream is also provided. Means 160 is coupled to graphics controller 140 by pixel bus 150. In the preferred embodiment, data bus 130 and data bus 130a are separate 8 bit buses. In an alternative embodiment, a single 16 bit data bus may be used to couple both first storage means 110 and a second storage means to graphics controller 140. Data buses of other widths may also be used.

FIG. 1 shows a base configuration of the present invention in which first storage means 110 is represented by RAM BANK 0. This base configuration may operate in an 8-bit CLUT mode. This mode allows operation of RAM BANK 0 as a Single Frame Buffer Architecture, similar to a VGA or XGA system in 8 bits per pixel mode. The 8-bit CLUT mode allows for operation of the base configuration as a video only or graphics only subsystem. The base configuration may also operate as a SFBA system with limited graphics/video integration (8 bits/pixel) as described in the Background section above. In the 8-bit CLUT mode, the bandwidth of data bus 130 is the same as would be required for a stand alone 8 bit CLUT graphics subsystem.

Means 120 for receiving a second storage means allows the base configuration of the present invention to be easily upgraded by the mere addition of a second storage means to operate either as (i) an integrated system for storing and displaying both graphics and video information ("the Dual Color Space Mode"), or as (ii) an expanded single frame buffer for storing and displaying either graphics only or video only information at a deepened pixel depth and/or increased resolution level ("the Expanded Single Frame Buffer Mode"). In the Dual Color Space Mode, a first type of visual data may be stored in first storage means 110 in a first format, and a second type of visual data may be stored in a second storage means in a second format which is different from the first format. For example, graphics data may be stored in first storage means 110 in RGB format, and video data may be stored in the second storage means in YUV format. In the Expanded Single Frame Buffer Mode, first storage means 110 and a second storage means preferably provide for operation of the system as a video only system or a graphics only subsystem with 16 bits per pixel. The Expanded Single Frame Buffer Mode may also operate as a SFBA system with limited graphics/video integration (16 bits/pixel) as described in the Background section above.

Graphics controller 140 includes means for forming a merged pixel stream from data in a first format stored on storage means 110 and data which may be stored in a second format on a second storage means, once a second storage means is received by means 120. According to a preferred embodiment, when the base system is upgraded (e.g., when a second storage means is received by means 120) and operating in the Dual Color Space Mode, graphics data is stored in one of the storage means in 8-bit CLUT format, and video data is stored in the other storage means as 8 bit YUV data. The preferred format of the 8 bit YUV data in the Dual Color Space Made is shown in Table I below, with each position being a single byte:

TABLE I $Y_a U_a Y_b V_a Y_c U_b Y_d V_b Y_e U_c \ldots$

In the Dual Color Space Mode, a first pixel stream representing the RGB graphics pixels ($GP_n$) is processed in parallel with a second pixel stream representing YUV video pixels. The two parallel pixel streams are stored in parallel in accordance with the format shown in Table II below:

TABLE II

| $GP_1$ | $GP_2$ | $GP_3$ | $GP_4$ | $GP_5$ | $GP_6$ | $GP_7$ | $GP_8$ | $GP_9$ | .... |
|---|---|---|---|---|---|---|---|---|---|
| $Y_a$ | $U_a$ | $Y_b$ | $V_a$ | $Y_c$ | $U_b$ | $Y_d$ | $V_b$ | $Y_e$ | .... |

The pixels generated by the video subsystem ($VP_n$) in the Dual Color Space Mode are preferably 24 bit RGB values derived from 24 bit YUV pixels. The 24 bit YUV pixels are determined for each video pixel $VP_n$, in accordance with the formula shown in Table III below:

TABLE III $Y=Y_a$, $U=U_a$, and $V=V_a$ for $VP_1$;

$Y=0.5Y_a+0.5Y_b$, $U=0.75U_a+0.25U_b$, and $V=0.75V_a+0.25V_b$ for $VP_2$;

$Y=Y_b$, $U=0.5U_a+0.5U_b$, and $V=0.5V_a+0.5V_b$ for $VP_3$;

$Y=0.5Y_b+0.5Y_c$, $U=0.25U_a+0.75U_b$, and $V=0.25V_a+0.75V_b$ for $VP_4$;

$Y=Y_c$, $U=U_b$, and $V=V_b$ for $VP_5$, and so on.

Other subsampling techniques may be used to build the RGB values.

In the preferred embodiment, chroma keying is preferably used on the graphics pixel stream to determine whether to show a graphics pixel or a video pixel. In the example of Table II, if $GP_3$ and $GP_4$, held pixel values equal to the chroma key value, then the merged graphics and video pixel stream (the visual pixel stream) provided to the DAC would have the format shown in Table IV below:

TABLE IV $GP_1$ $GP_2$ $VP_3$ $VP_4$ $GP_5$ $GP_6$ $GP_7$ $GP_8$ $GP_9$ . . .

Figure 2:
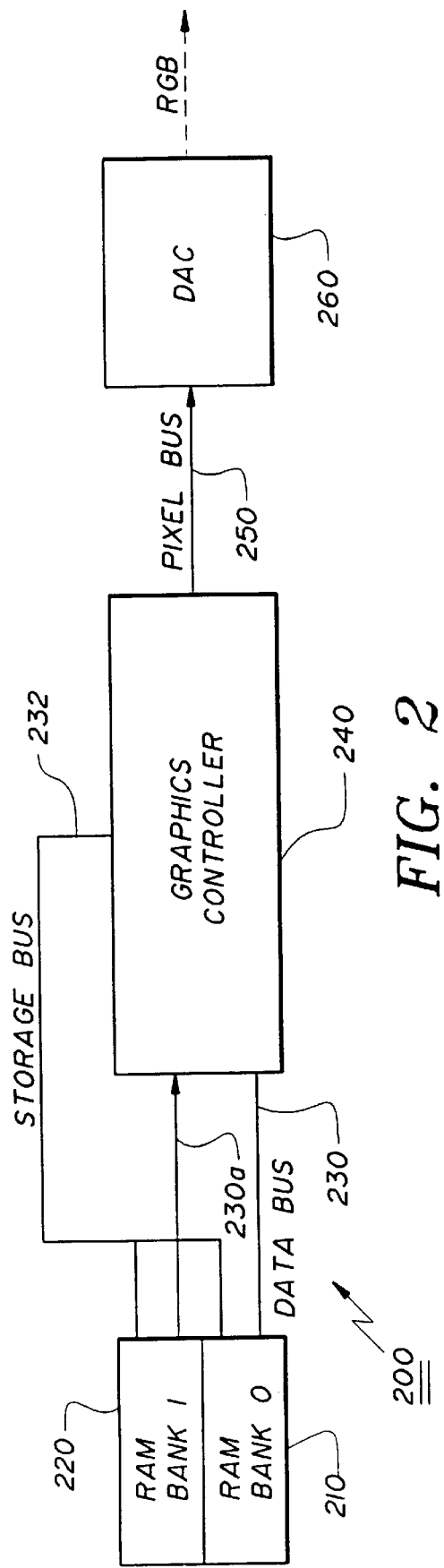
FIG. 2 is a block diagram illustrating the operation of a second preferred embodiment of the present invention.

Referring now to FIG. 2, there is shown a block diagram illustrating the operation of an apparatus, designated generally 200, for processing visual data according to a second preferred embodiment of the present invention. The invention shown includes first storage means 210 for storing a first bit plane of visual data in a first format. First storage means 210 is coupled to graphics controller 240 through storage bus 232. First storage means 210 and graphics controller 240 are also coupled by data bus 230. The invention also includes second storage means 220 for storing a second bit plane of visual data in a second format different from the first format. Second storage means 220 is coupled to graphics controller 240 through storage bus 232. Second storage means 220 and graphics controller 240 are also coupled by data bus 230a.

Graphics controller 240 includes means for forming a merged pixel stream from visual data stored on said first and second storage means. Means 260 for displaying the merged pixel stream is also provided. Means 260 is coupled to graphics controller 240 by pixel bus 250. In the preferred embodiment, data bus 230 and data bus 230a are separate eight bit buses. In an alternative embodiment, a single 16 bit data bus may be used to couple both first storage means 210 and second storage means 220 to graphics controller 240. Data buses of other widths may also be used. Apparatus 200 functions substantially in accordance with apparatus 100, with a second storage means having been received by means 120. Apparatus 200 is thus configured to operate either in the Dual Color Space or the Expanded Single Frame Buffer Modes described above.

The present invention may be embodied in other specific forms without departing from the spirit or essential attributes of the invention. Accordingly, reference should be made to the appended claims, rather than the foregoing specification, as indicating the scope of the invention.

What is claimed is:

1. An apparatus for processing visual data, comprising:
   (a) a first storage means providing first memory locations for storing graphics data in a color lookup table (CLUT) color format, and a graphics controller coupled to said first storage means by a first data bus and a storage bus;
   (b) means for receiving a second storage means providing second memory locations for storing video data in a subsampled YUV color format, said means for receiving being coupled to said graphics controller by a second data bus and the storage bus, said means for receiving for coupling the second storage means to the graphics controller by the second data bus and the storage bus;
   (c) means for forming a merged pixel stream from the graphics data stored in the first memory locations and the video data stored in the second memory locations, wherein said merged pixel stream is formed by means (c) employing chroma keying in which a pixel of the pixel stream represents video data when a corresponding graphics pixel of the graphics data represents a chroma key value; and
   (d) means, coupled to said graphics controller, for generating an analog signal representative of the merged pixel stream.

2. The apparatus of claim 1, further comprising:
   (e) means for serially providing pixels of the graphics data stored in the first memory locations, wherein the first memory locations include dynamic random access memory locations.

3. The apparatus of claim 1, further comprising:
   (e) means for serially providing pixels of the video data stored in the second memory locations, wherein the second memory locations include dynamic random access memory locations.

4. The apparatus of claim 1, wherein the analog signal is in an RGB format.

5. The apparatus of claim 1, further comprising:
   (e) means for serially providing pixels of the graphics data stored in the first memory locations; and
   (f) means for serially providing pixels of the video data stored in the second memory locations; wherein:
      the first memory locations, means (e), the second memory locations, and means (f) are included in one or more random access memory devices;
      means (c) is included in the graphics controller;
      means (d) comprises a digital-to-analog converter; and
      the analog signal is in an RGB format.

6. The apparatus of claim 1, wherein the subsampled YUV color format is a subsampled YUV4:1:1 color format.

7. The apparatus of claim 1, wherein the merged pixel stream formed by means (c) comprises 24-bit RGB pixels.

8. The apparatus of claim 1, wherein the graphics data and the video data represent images stored at different spatial resolutions.

9. A method for processing visual data, comprising the steps of:
   (a) storing in first memory locations of a first storage means graphics data in a color lookup table (CLUT) color format, wherein the first storage means is coupled to a graphics controller by a first data bus and a storage bus;
   (b) receiving, with a means for receiving, a second storage means and storing in second memory locations of said second storage means video data in a subsampled YUV color format, said means for receiving being coupled to said graphics controller by a second data bus and the storage bus, said means for receiving for coupling the second storage means to the graphics controller by the second data bus and the storage bus;
   (c) forming a merged pixel stream from the graphics data stored in the first memory locations and the video data stored in the second memory locations, wherein said forming comprises the step of employing chroma keying in which a pixel of the pixel stream represents video data when a corresponding graphics pixel of the graphics data represents a chroma key value; and
   (d) generating, with a means for generating coupled to said graphics controller, an analog signal representative of the merged pixel stream.

10. The method of claim 9, further comprising the step of:
    (e) serially providing pixels of the graphics data stored in the first memory locations, wherein the first memory locations include dynamic random access memory locations.

11. The method of claim 9, further comprising the step of:
    (e) serially providing pixels of the video data stored in the second memory locations, wherein the second memory locations include dynamic random access memory locations.

12. The method of claim 9, wherein the analog signal is in an RGB format.

13. The method of claim 9, further comprising the steps of:
    (e) serially providing pixels of the graphics data stored in the first memory locations; and
    (f) serially providing pixels of the video data stored in the second memory locations; wherein:
       the first memory locations, means for performing step (e), the second memory locations, and means for performing step (f) are included in one or more random access memory devices;
       step (c) is implemented by the graphics controller;
       step (d) comprises digital-to-analog conversion; and
       the analog signal is in an RGB format.

14. The method of claim 9, wherein the subsampled YUV color format is a subsampled YUV4:1:1 color format.

15. The method of claim 9, wherein the merged pixel stream formed by step (c) comprises 24-bit RGB pixels.

16. The method of claim 9, wherein the graphics data and the video data represent images stored at different spatial resolutions.

* * * * *